United States Patent [19]

Motoyanagi

[11] Patent Number: 5,200,991
[45] Date of Patent: Apr. 6, 1993

[54] IMAGE COMMUNICATION SYSTEM INCLUDING A MOBILE TELEPHONE SET AND A FACSIMILE DEVICE

[75] Inventor: Teruo Motoyanagi, Hino, Japan

[73] Assignee: Kabushiki Kaisha Toshiba, Kawasaki, Japan

[21] Appl. No.: 731,398

[22] Filed: Jul. 17, 1991

Related U.S. Application Data

[63] Continuation of Ser. No. 541,977, Jun. 22, 1990, abandoned.

[30] Foreign Application Priority Data

Jun. 23, 1989 [JP] Japan ................................. 1-161789
Mar. 16, 1990 [JP] Japan ................................. 2-66672

[51] Int. Cl.⁵ .......................................... H04M 11/06
[52] U.S. Cl. ...................................... 379/61; 379/100; 379/110; 358/442
[58] Field of Search ..................... 379/33, 58, 61, 63, 379/100, 110; 358/400, 442, 468

[56] References Cited

U.S. PATENT DOCUMENTS

| | | | |
|---|---|---|---|
| 4,752,949 | 6/1988 | Steinbeck et al. | 379/61 |
| 4,823,373 | 4/1989 | Takahashi et al. | 379/58 |
| 4,881,129 | 11/1989 | Mitsuhashi | 379/100 |
| 4,956,876 | 9/1990 | Koshiishi | 379/100 |
| 4,977,609 | 12/1990 | McClure | 379/59 |
| 4,979,205 | 12/1990 | Haraguchi et al. | 379/61 |
| 5,041,917 | 8/1991 | Koshiishi | 379/33 |

Primary Examiner—Curtis Kuntz
Assistant Examiner—Dwayne D. Bost
Attorney, Agent, or Firm—Finnegan, Henderson, Farabow, Garrett & Dunner

[57] ABSTRACT

An image communication apparatus in which a mobile telephone set of a cordless telephone device is connected with a facsimile device through a connector and in which the connection of a telephone line of the mobile telephone set with a communnication unit of the facsimile device is controlled on the basis of the state of the connection and the state of a telephone line for facsimile communication. A connection cord for the facsimile device is not required which enables free movements of an operator and the devices. Further, no additional parts such as an acoustic coupler and no manual operations are required when a call is originated or received, and facsimile communication can be made easily from any place.

25 Claims, 6 Drawing Sheets

IMAGE COMMUNICATION SYSTEM INCLUDING A MOBILE TELEPHONE SET AND A FACSIMILE DEVICE

This application is a continuation, of application Ser. No. 07/541,977 filed Jun. 22, 1990, abandoned.

BACKGROUND OF THE INVENTION

1. Field of the Invention

The present invention relates to image communication apparatus in which a mobile telephone set of a cordless telephone device is connected with a facsimile device for facsimile communication.

2. Description of the Background Art

Recently, there is an increasing demand for the use of a facsimile device by moving same at any position as the facsimile device is miniaturized and lightened and a variety of communications is developed.

The most common measure to satisfy such demand is to use a facsimile device connected with a telephone line.

Figure 7:
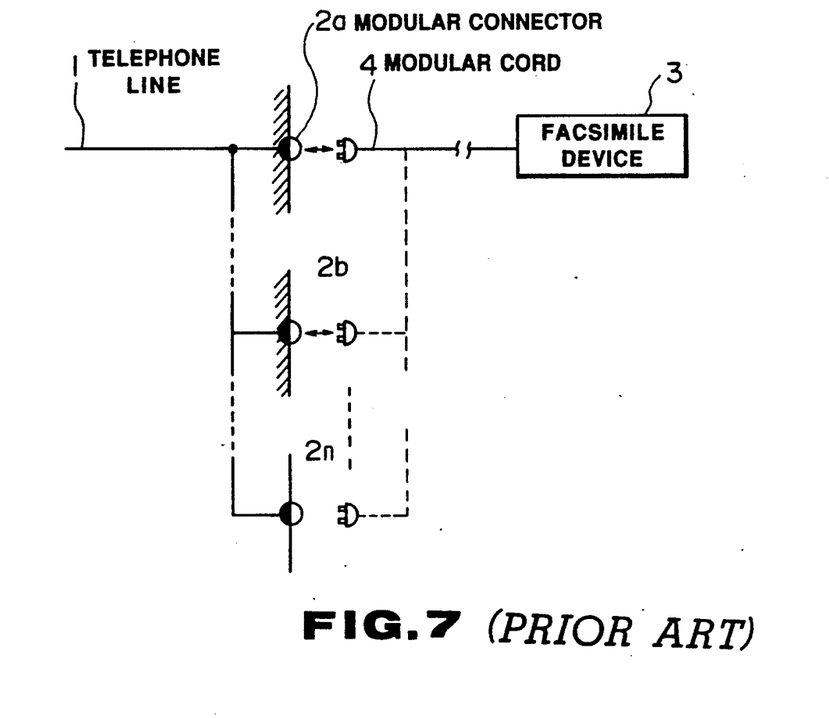
FIGS. 7 and 8 are a conceptual view illustrating of a respective one of the aspects of use of a conventional image communication apparatus of this type.

FIG. 7 illustrates one example of a conventional system structure employing such a form of use.

In FIG. 7, there are a plurality of modular connectors $2a-2n$ branching from a telephone line 1 in each of several rooms or on each of floors in a building. A facsimile device 3 has a modular cord 4 connected thereto.

In this conventional system, the facsimile device 3 is carried to the place where the modular connectors $2a-2n$ are disposed and is connected with any particular one of them through the modular cord 4 for facsimile communication.

Since the modular connectors $2a-2n$ are disposed at fixed places and the number of modular connectors is limited, the place for the facsimile device 3 which can be used by connection to any one of those connectors $2a-2n$ is restricted within a very limited range in each of the rooms or on each of the floors where the modular connectors $2a-2n$ are disposed.

In the conventional system the limitation to the place where the facsimile device is used can be alleviated by increasing the length of the modular cord 4, which would conversely become a hindrance to the movement of the facsimile device 3 or to the walk of the operator.

Figure 8:
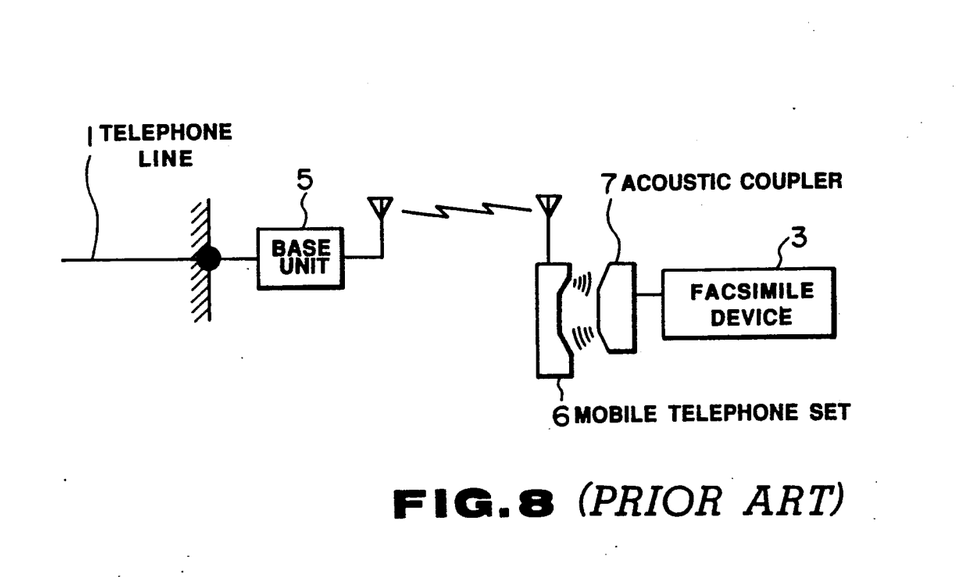

In order to cope with this situation, a system is conventionally proposed which has a structure shown in FIG. 8. As shown in FIG. 8, the system includes a cordless telephone device provided between the facsimile device 3 and the telephone line 1. A base unit 5 of the telephone device is connected with the telephone line 1 and can communicate with a mobile telephone set 6 by radio. In this system, the cordless telephone device 6 is connected through an acoustic coupler 7 with the facsimile device 3 for facsimile communication.

In this system, no connection cord is provided between the base unit 5 and the mobile telephone set 6, so that a hindrance of the cord to the movement of the facsimile device 3 or the walk of the operator is eliminated.

However, this conventional system requires the acoustic coupler 7 as an additional part to the system and the coupler is required to be carried at all times together with the facsimile device 3 proper.

When the acoustic coupler 7 is used, it requires the intervention of the operator due to the function of the coupler 7 and facsimile communication cannot be performed unless call origination or reception is performed manually on all such occasions.

The conventional systems in which the facsimile device is moved for use are mainly divided into two in use: the use of the facsimile devices connected to the telephone line through a cord or the like; and the use of the facsimile device connected through an acoustic coupler to a mobile telephone set of the cordless telephone device.

However, the former system has the problem that the place where the facsimile device is used is limited to the place where the telephone line is available or the place where the modular connectors are disposed through a line extending from the telephone line. In addition, the connection cord will become a hindrance to walk or the movement of the facsimile device.

The latter system has the problem that the facsimile device proper and the acoustic coupler as an additional part thereto must be carried together, and that troublesome operations must be performed when facsimile communication starts and ends.

SUMMARY OF THE INVENTION

It is an object of the present invention to provide an image communication apparatus which is capable of performing facsimile communication by moving the facsimile device to any particular place without bringing about any hindrance to the walk of the operator and the movement of the facsimile device.

It is another object of the present invention to provide an image communication apparatus which is capable of performing facsimile communication without requiring special additional parts such as the acoustic coupler and troublesome operations by the operator.

It is a further object of the present invention to provide an image communication apparatus which is capable of performing facsimile communication while making the best use of the functions of the cordless telephone device and a mobile telephone set without hindering the proper use of the cordless telephone device and their mobile telephone units.

It is a still further object of the present invention to provide an image communication system which further alleviates the limitations to the place where the facsimile device is used.

It is a further object of the present invention to provide an image communication apparatus which improves the charging operation efficiency of a telephone unit of the cordless telephone device constituting a part of the system.

In order to achieve the above objects, the present invention provides an image communication apparatus comprising: means for removably connecting a mobile telephone set of a cordless telephone device with a facsimile device; means for detecting the connection between the mobile telephone set and the facsimile device through the connecting means; means for monitoring the state of a telephone line by which the mobile telephone set and the facsimile device is connected, whereby a signal path is selectively established between a radio communication unit of the mobile telephone set and a facsimile communication unit of the facsimile device on the basis of the result of the detection by the detecting means and the result of the monitoring by the monitoring means for facsimile communication.

The present invention also provides an image communication apparatus comprising: means for removably connecting a mobile telephone set of a cordless telephone device and a facsimile device; first switching means for selectively switching the connection with a radio communication unit of the mobile telephone set to the connecting means or to a hook switch in the mobile telephone set; second switching means for selectively switching the connection with the connecting means either to an incoming signal path leading to the hook switch of the mobile telephone set or to a facsimile communication unit through the connecting means; means for detecting the connection of the mobile telephone set with the facsimile device by the connecting means; means for monitoring the state of a telephone line and the presence of an incoming signal from the line; and control means for switching the first switching means to the connecting means in accordance with the connection of the mobile telephone set with the facsimile device, switching the second switching means to the incoming signal path, and detecting an incoming signal using the monitoring means under such conditions to switch the second switching means to the facsimile communication unit.

In the present invention, the system structure includes a plurality of mobile telephone sets with means for connecting with the facsimile device.

In the present invention, the connecting means includes halves of a first subconnector constituting a path for connecting the first switching means and the second switching means, halves of a second subconnector for constituting a path through which an incoming signal input from the mobile telephone set through the first subconnector is sent back to the hook switch of the mobile telephone set through the second switching means, a third subconnector constituting a path through which control information is transmitted/received between control units of the mobile telephone set and the facsimile unit, and a fourth subconnector constituting a path through which an operating power source for the mobile telephone set and a power source for the facsimile device are connected.

As just described above, in the present invention, the facsimile device is connected with the mobile telephone set of the cordless telephone device to make facsimile communication using the radio communication function of the mobile telephone set. No connection code intervenes between the mobile telephone set, and the facsimile device maintained in connection and the base unit, so that there are no hindrances to the walk of the operator and the movement of the facsimile device. As a result, the facsimile device can be easily moved to any place and image communication can be made there.

Since the mere electrical connecting means is used for connection of the mobile telephone set of the telephone device and the facsimile device, no additional parts such as the acoustic coupler are required and manual operations specific to the used of such additional parts are required to thereby greatly reduce the operation by the operator.

In the present invention, one of the first and second switching means is selected in the actual communication in accordance with a state in which a mobile telephone set of the cordless telephone device and the facsimile device are connected and the conditions under which the line is monitored to thereby establish a communication line following every situation.

Thus, automatic facsimile reception is performed under the situation where the mobile telephone set and the facsimile device are connected, as mentioned above. In addition, the mobile telephone set can make a telephone communication by itself when the mobile telephone set is connected with, or disconnected from, the facsimile device.

In that case, the efficient use of the mobile telephone sets can be realized which makes the best use of the proper communication function of the mobile telephone sets such as access to an addressee's facsimile device using the auto-dialing function of the mobile telephone sets.

As an example, according to the present invention, the apparatus permits starting facsimile communication by automatically responding to an incoming signal from a telephone line when the mobile telephone set is connected with the facsimile device and permits interrupting the line by recognizing the termination of the transmission by an addressor's terminal.

When there is such incoming signal, telephone communication can be made by responding to the incoming signal through the off-hook operation of the mobile telephone set or through a lift of the mobile telephone set from the facsimile device.

Similarly, call origination can be made establish telephone communication through the off-hook operation at the mobile telephone set or through a lift of the mobile telephone set from the facsimile device.

With the mobile telephone set being connected with the facsimile device, a shift can be made from telephone communication to facsimile communication immediately through predetermined communication operations.

Similarly, with the mobile telephone set being disconnected from the facsimile device, a shift can be made from telephone communication to facsimile communication immediately through connection of the mobile telephone set with the facsimile device.

With the mobile telephone set being disconnected from the facsimile device, the mobile telephone set can ring a bell to thereby allow the operator to recognize the presence of the incoming signal and to respond by telephone communication.

In the present invention, there are provided the plurality of mobile telephone sets having means for connection with the facsimile device, so that the place where a mobile telephone set is connected with the facsimile device can be selected with high freedom and the restriction to the place where the facsimile device is used can be further alleviated.

In the present invention, when telephone communication or facsimile communication is being made with the mobile telephone set being connected with the facsimile device, charging can be made by providing charging connector halves in addition to connector halves for facsimile communication.

Therefore, it is unnecessary to take the trouble to come to the base unit in order to charge a mobile telephone set to thereby greatly improve the efficiency of operation for such charging.

DETAILED DESCRIPTION OF THE PREFERRED EMBODIMENTS

Embodiments of the present invention will be described in detail with reference to the drawings.

Figure 1:
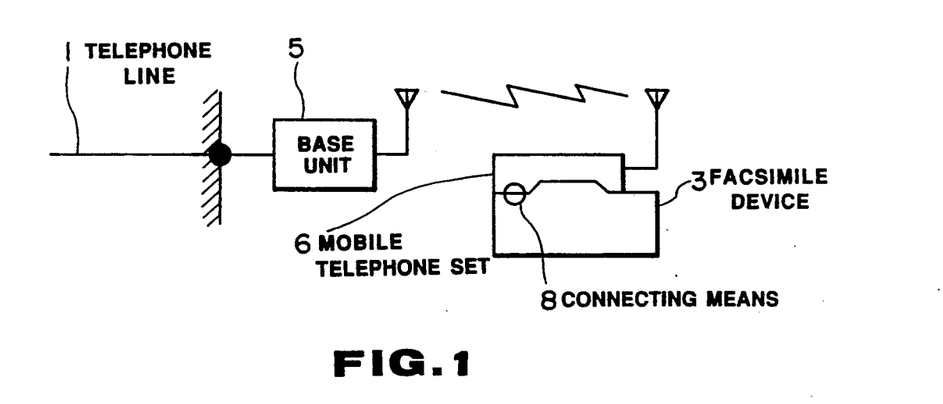
FIG. 1 is a conceptual view illustrating one aspect of use of an image communication apparatus according to the present invention.

FIG. 1 conceptually illustrates one example of the aspects of use of an image communication apparatus according to the present invention. In FIG. 1, a base unit 5 of a cordless telephone device is connected with a telephone line 1. A mobile telephone set 6 of the telephone device is connected through a radio circuit with the base unit 5. If the mobile telephone set 6 is in a range in which it can communicate with the base unit 5 through the radio circuit, it can move freely within the range.

A facsimile device 3 is connected with the mobile telephone set 6 through connecting means 8 which is different from an acoustic coupler and which is used to solely connect the mobile telephone set 6 electrically with the facsimile device. The connecting means 8 has a structure by which the mobile telephone set 6 is removably attached to the facsimile device 3. Means for detecting the state in which the mobile telephone set 6 is connected with the facsimile device 3 is provided either on the mobile telephone set 6 or on the facsimile unit 3 or on both.

The respective control units of the mobile telephone set 6 and the facsimile unit 3 establish an appropriate communication route on the basis of the state of the connection and the telephone lines to provide communication control to be described hereinafter under various conditions.

In the FIG. 1 system, when there is an incoming facsimile signal from the telephone line 1 with the mobile telephone set 6 connected with the facsimile device 3 through the connecting means 8, the facsimile device 3 responds automatically to the signal for reception.

In response to the incoming signal, the bell rings. Thus the system may be used such that the response of the mobile telephone set 6 to the incoming signal is allowed either through the off-hook operation at the mobile telephone set 6 or through a lift of the mobile telephone set 6 from the facsimile device 3.

When the bell rings in response to an incoming signal in a state where the mobile telephone set 6 is disconnected from the facsimile device 3, the mobile telephone set 6 can respond to the incoming signal by recognizing same.

In the response to the incoming signal using any one of the above methods, the mobile telephone set 6 can make a telephone communication as it is if the incoming signal is a voice signal.

If the incoming signal is a facsimile signal, a shift may be made to facsimile reception either by performing a special switching operation under the connection of the mobile telephone set with the facsimile device or by reconnecting the mobile telephone set 6 with the facsimile device 3 depending on the manner of response to the incoming signal (either the off-hook operation or the disconnecting operation).

In transmission, call origination can be made by dialing through the off-hook operation of the mobile telephone set 6 or through disconnection from the facsimile device 3, and telephone communication can be made after the addressee's response to the call origination.

If the responding addressee's terminal in telephone communication is a telephone set, the mobile telephone set 6 can intactly make telephone communication.

If the responding addressee's terminal is a facsimile device, a shift may be made to facsimile communication either by performing a special switching operation under the connection of the mobile telephone set with the facsimile device or by reconnecting the mobile telephone set 6 with the facsimile device 3, depending on whether the call origination is made by the off-hook operation or by disconnection of the mobile telephone set from the facsimile device, respectively.

As just described above, in the FIG. 1 system, the facsimile device is constituted integrally with the mobile telephone set 6 and facsimile communication is made using the radio communication function of the mobile telephone set 6.

Since there is no connection cord intervening between the mobile telephone set 6, facsimile device 3 and the base unit 5, operator's walk or device movement can be made smoothly.

The mobile telephone set 6 can move freely within a range in which electrical waves are effective. By connecting the facsimile device 3 with the mobile telephone set 6 and causing the facsimile device 3 to follow the movement of the mobile telephone set 6, facsimile communication can be made from any place in the range.

Figure 2:
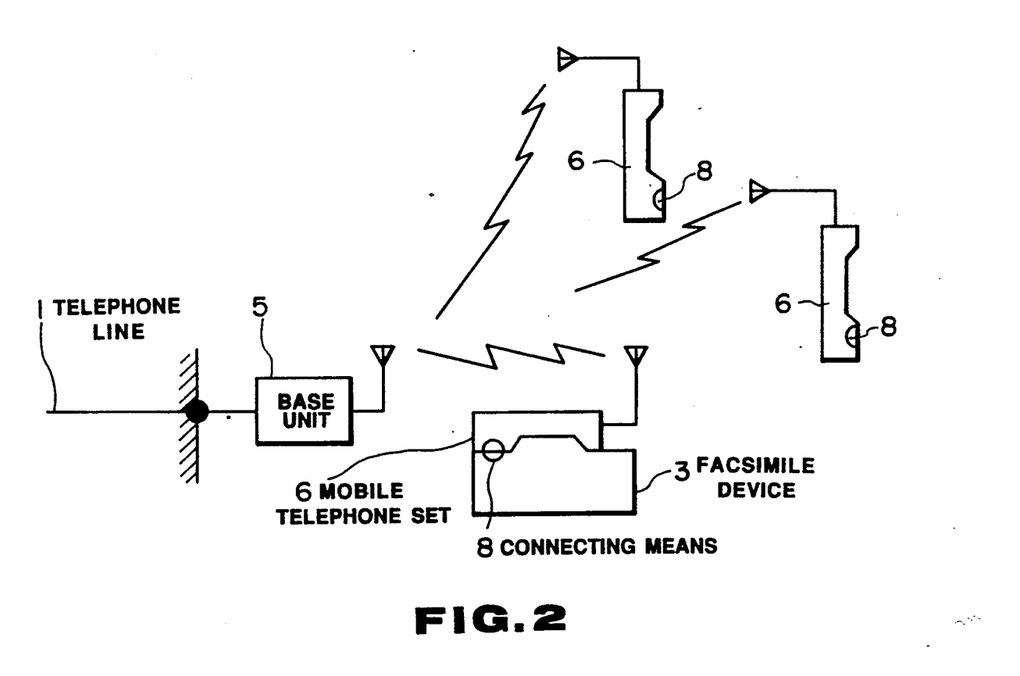
FIG. 2 is a conceptual view illustrating another aspect of use of an image communication apparatus according to the present invention.

FIG. 2 illustrates the structure of another system according to the present invention in which a plurality of mobile telephone sets 6 are disposed which have connecting means 8 used for connection with the facsimile device 3.

The system of FIG. 2 is similar to that of FIG. 1 in that the facsimile device can be moved to any position for facsimile communication without being hindered by the connection cord.

Since the plurality of the mobile telephone set 6 having the connection means 8 are disposed in the system of FIG. 2, the place where the facsimile device 3 is used or connected can be selected with high freedom to thereby improve the efficiency of use compared to the system where a single mobile telephone set 6 is provided.

Figure 3:
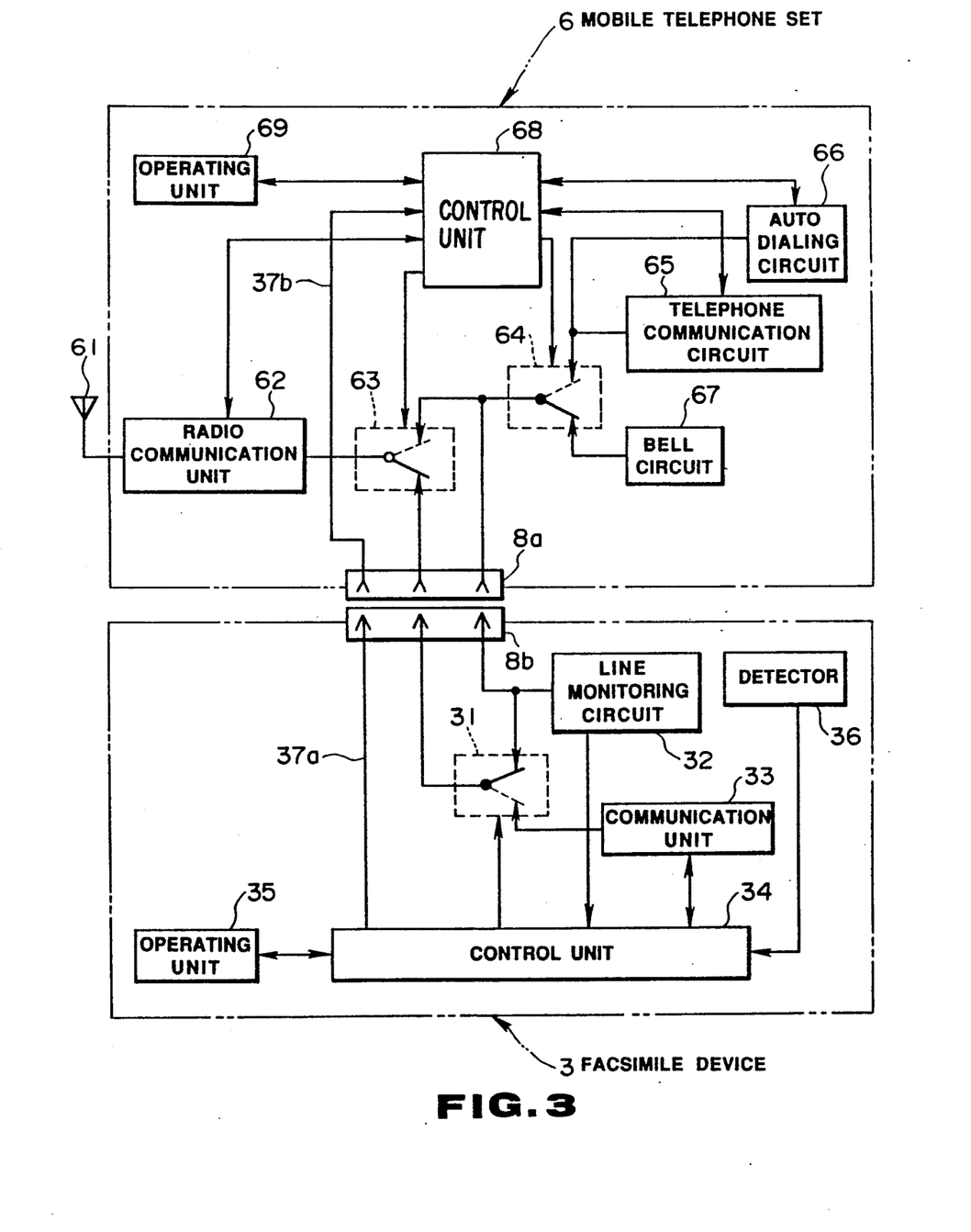
FIG. 3 is a detailed block diagram of the essential portion of an image communication apparatus as one embodiment of the present invention.

The detailed operation of the image communication apparatus according to the present invention will now be described in conjunction with its specific structure. FIG. 3 is a block diagram of one embodiment of the image communication apparatus according to the present invention which illustrates the connection of the mobile telephone set 6 and the facsimile device 3. In FIG. 3, the mobile telephone set 6 includes an antenna 61, a radio communication unit 62, a changeover switch 63, a hook switch 64, a talking circuit 65, an auto-dialing circuit 66, a bell circuit 67, a control unit 68 and an operating unit 69.

The facsimile device 3 includes a changeover switch 31, a line monitoring circuit 32, a communication unit 33, a control unit 34, an operating unit 35 and a detector 36.

The connection between the mobile telephone set 6 and the facsimile device 3 is made by halves 8a and 8b of a connector corresponding to the connecting means 8 used in the system.

The connector halves 8a and 8b include halves of a first subconnector which may construct a route through which the changeover switch 63 of the mobile telephone set 6 is connected with and the changeover switch 31 of the facsimile device 3, halves of a second subconnector which may construct a route through which incoming signal, input from the mobile telephone set 6 to the facsimile device 3 through the first subconnector halves, is sent back to the mobile telephone set 6, and halves of a third subconnector which may construct a route (37a, 37b) through which control data is transmitted/received between the control units 34 and 68 of the facsimile device 3 and the mobile telephone set 6. By such structure, the connector halves 8a and 8b removably connects the mobile telephone set 6 and the facsimile device 3.

In FIG. 3, when the mobile telephone set 6 and the facsimile device 3 are connected by the connector halves 8a and 8b, the detector 36 of the facsimile device 3 detects this fact and outputs a signal indicative of that detection to the control unit 34, which delivers a signal indicative of that connection to the control unit 68 of the mobile telephone set 6 through a signal line 37a, the connector halves 8b and 8a and a signal line 37b.

Thus, the control unit 68 of the mobile telephone set 6 switches the hook switch 64 to an onhook state (to the solid line side shown) and simultaneously switches the changeover switch 63 to the facsimile device 3 side (to the solid line side shown).

At this time, if there is an incoming signal from the telephone line 1, the mobile telephone set 6 receives the electrical waves, sent by the base unit 5, at the radio communication unit 62 via the antenna 61.

By this reception, the radio communication unit 62 delivers a ring tone signal, which is then delivered to the changeover switch 31 of the facsimile device 3 through the changeover switch 63 and the connector halves 8a and 8b.

At this time, the changeover switch 31 is already put in the state shown by the solid line shown. Thus, the ring tone signal is delivered to the hook switch 64 of the mobile telephone set 6 through the connector halves 8b and 8a.

At this time, the hook switch 64 is maintained in the on-hook state, as mentioned above. Therefore, the ring tone is sent to the bell circuit 67 through the hook switch 64 to thereby ring the bell which sounds the incoming tone.

At the same time, the ring tone is detected by the line monitoring circuit 32 between the changeover switch 31 and the connector half 8b, and the result is delivered to the control unit 34 which switches the changeover switch 31 to the communication unit 33 side (the broken line side shown) on the basis of the detected results. Thus, the radio communication unit 62 of the mobile telephone set 6 is connected to the communication unit 33 of the facsimile device 3 via the changeover switch 63, connector halves 8a, 8b, and changeover switch 31.

As a result, the communication unit 33 of the facsimile device 3 is connected with the telephone line 1 by radio between the mobile telephone set 6 and the base unit 5.

Therefore, at this time, the facsimile device 3 automatically responds to an incoming signal from the addressor's facsimile device in accordance with regular facsimile procedures to thereby perform facsimile reception. Thereafter, when the addressor's facsimile device terminates its transmission, state change such as polarity inversion will occur on the telephone line 1. This state change is reported through the communication route to the control unit 34 of the facsimile device 3.

Thus, the control unit 34 recognizes the termination of the transmission and immediately returns the changeover switch 31 to the solid line side shown and simultaneously opens the telephone line 1. The above description refers to the case where the facsimile reception is preferentially performed over telephone communication by the mobile telephone set 6.

Similarly, when facsimile reception is performed preferentially, no incoming sound is generated by the bell circuit 67 when there is an incoming signal and the facsimile reception is performed without bell ringing.

The response without bell ringing is realized beforehand by switching the changeover switch 63 to the solid line shown and disconnecting the hook switch 64 from the bell circuit 67.

In the present invention it is also possible to preferentially receive telephone communication by the mobile telephone set 6 in a manner converse to the above control. In this case, the changeover switch 31 is switched to the communication unit 33 side a predetermined time after the ring tone is detected by the line monitoring circuit 32. Thus, bell ringing is performed for the predetermined time by the bell circuit 67.

Only when there is no response by the mobile telephone set 6 during the predetermined time, the automatic facsimile reception is made.

In contrast, when the mobile telephone set 6 responds within the predetermined time, the following control is provided. More specifically, an off-hook operation is performed at the operating unit 69 of the mobile telephone set 6 in response to the bell ringing, this fact is reported to the control unit 68, which switches the changeover switch 63 and the hook switch 64 together to the broken line side shown. Thus, the telephone communication circuit 65 of the mobile telephone set 6 is connected to the radio communication unit 62 to thereby allow response to the telephone communication.

By this response, the operator can hear an incoming voice through a handset (not shown) and can identify whether it is an incoming telephone signal or an incoming facsimile signal.

If it is an incoming telephone signal, he can make telephone communication without requiring any other operations. If it is an incoming facsimile signal, the operator performs required operations at the operating unit 69 to shift to reception of the facsimile signal. For example, the operator at the mobile telephone set 6 presses a specific switch (a communication switch) (not shown) at the operating unit 69 for shifting to facsimile reception. At this time, the control unit 68 recognizes the pressing of the communication switch and switches the changeover switch 63 and the hook switch 64 again to the solid line side shown.

At the same time, the control unit 34 of the facsimile device 3 receives a signal indicative of the pressing of the communication switch from the control unit 68 of the mobile telephone set 6 and switches the changeover switch 31 to the broken line side shown on the basis of that reporting.

Thus, the communication unit 33 of the facsimile device 3 is connected to the radio communication unit 62 of the mobile telephone set 6 to thereby establish the same communication route as that established on automatic reception of the facsimile signal. Therefore, thereafter, the facsimile device 3 can receive a facsimile signal from the addressor's facsimile device in accordance with regular facsimile procedures.

The transmission by the image communication apparatus according to the present invention will be described hereinafter. In FIG. 3, when call origination is made with the mobile telephone set 6 being connected with the facsimile device 3, an off-hook operation is performed at the operating unit 69 of the mobile telephone set 6. By recognizing this off-hook operation, the control unit 68 switches the changeover switch 63 and the hook switch 64 to the broken line side shown. Thus, the auto-dialing circuit 66 is connected to the radio communication unit 62 and auto-dialing can be made in accordance with a dial input signal input thereafter.

When the addressee's terminal responds to this dialing call, the mobile telephone set 6 can hear an answer sound from the addressee's terminal through the handset (not shown).

If the addressee's terminal is a telephone set, the answer sound is a talking voice and thereafter the addresser can make telephone communication while maintaining its state.

If the operator recognizes that the answer sound is not a talking voice when the addressee's terminal is a facsimile device, and presses the telephone communication switch on the operating unit 69, facsimile communication is selected. More particularly, if the operator presses the communication switch by recognizing the response of the addressee's facsimile device after dialing call from the mobile telephone set, the control unit 68 recognizes such fact and switches the the switch 63 and the hook switch 64 to the solid line sides on the basis of the recognition.

Simultaneously, the control unit 34 of the facsimile device 3 switches the changeover switch 31 to the broken line side shown, in accordance with the information from the control unit 68 of the mobile telephone set 6. Thus, communication unit 33 of the facsimile device 3 is connected with the radio communication unit 62 of the mobile telephone set 6 and further with the telephone line by radio between the base unit 5 and the mobile telephone set. Thereafter, the facsimile device 3 uses itself as a transmitting end to transmit and receive required signals to and from the addressee's facsimile device to thereby start facsimile transmission. When this transmission has ended, the control unit 34 returns the changeover switch 31 to the solid line side shown and opens the telephone line 1 to ends its operation. The above relates to the illustrative operation performed between the mobile telephone set 6 and the facsimile device 3.

The operation performed under conditions where the mobile telephone set is disconnected from the facsimile device will be described next. In FIG. 3 when telephone communication is being made under such conditions, facsimile communication is selected by pressing the communication switch on the operating unit 69 and connecting the mobile telephone set 6 to the facsimile device 3. When the mobile telephone set 6 is making a telephone communication under the conditions where the mobile telephone set 6 is disconnected from the facsimile device, the changeover switch 63 and hook switch 64 are switched together to the broken line side shown. When the communication switch is pressed at the operating unit 69 at this time, the control unit 68 recognizes this fact and compulsively puts the hook switch 64 in an off-hook state (at the broken line position shown).

When the mobile telephone set 6 is connected with the facsimile device 3 through the connector halves 8a and 8b under such conditions, the facsimile device 3 detects this fact by its detector 36 and reports this detection to the control unit 34, which sends to the control unit 68 of the mobile telephone set 6 through the connector halves 8a and 8b via the signal line 37b a control signal indicating that the mobile telephone set 6 is connected with the facsimile device 3. Thus, the control unit 68 switches the changeover switch 63 to the facsimile device 3 side (to the solid line side shown).

When the line monitoring circuit 32 detects that the telephone line 1 remains closed, the control unit 34 switches and connects the changeover switch 31 with the communication unit 33 side on the basis of the results of the detection.

Thereafter, the facsimile device 3 can receive a facsimile signal from the addressee's terminal under the control of the control unit 34. While this is an example of control under which telephone communication of the mobile telephone set 6 is established by the incoming signal from the addressee, it can be established by call origination from the mobile telephone set 6 itself. In this case, after the facsimile device 3 is connected with the mobile telephone set 6, the control unit 34 recognizes a communication starting command given through the signal line 37b, the connector halves 8a and 8b and the signal line 37a from the control unit 68 on the basis of the operation at the operating unit 69 of the mobile telephone set 6 to switch the changeover switch 31 to the communication unit 33 side. Thereafter, the facsimile device 3 starts facsimile transmission in accordance with the communication starting command.

In the facsimile transmission/reception started under the disconnection of the mobile telephone set from the facsimile device, the control unit 34 switches the changeover switch 31 to the communication unit 33 side simultaneously with the establishment of the connection, and sends a signal to release the off-hook state to the control unit 68 of the mobile telephone set 6 through the signal line 37a, the connector halves 8b and 8a and the signal line 37b.

Immediately when the control unit 68 receives this signal, it changes the hook switch 64 to the solid line side shown and releases the off-hook state.

Thereafter, when the facsimile reception or transmission is terminated, the control unit 34 switches the changeover switch 31 to the shown solid line side to open the telephone line 1.

When the mobile telephone set 6 makes call origination to shift to telephone communication under the conditions where the mobile telephone set 6 is disconnected from the facsimile device, the mobile telephone set 6 can, of course, recognize the pressing of the off-hook switch at the operating unit 69 to connect the hook switch 64 to the auto-dialing circuit 66 and send a call signal on the basis of a dialing signal input thereafter.

From the above, in the present invention, the mobile telephone set 6 can be used without hindering regular telephone communication under the conditions where the mobile telephone set 6 is disconnected from the facsimile device 3.

Figure 4:
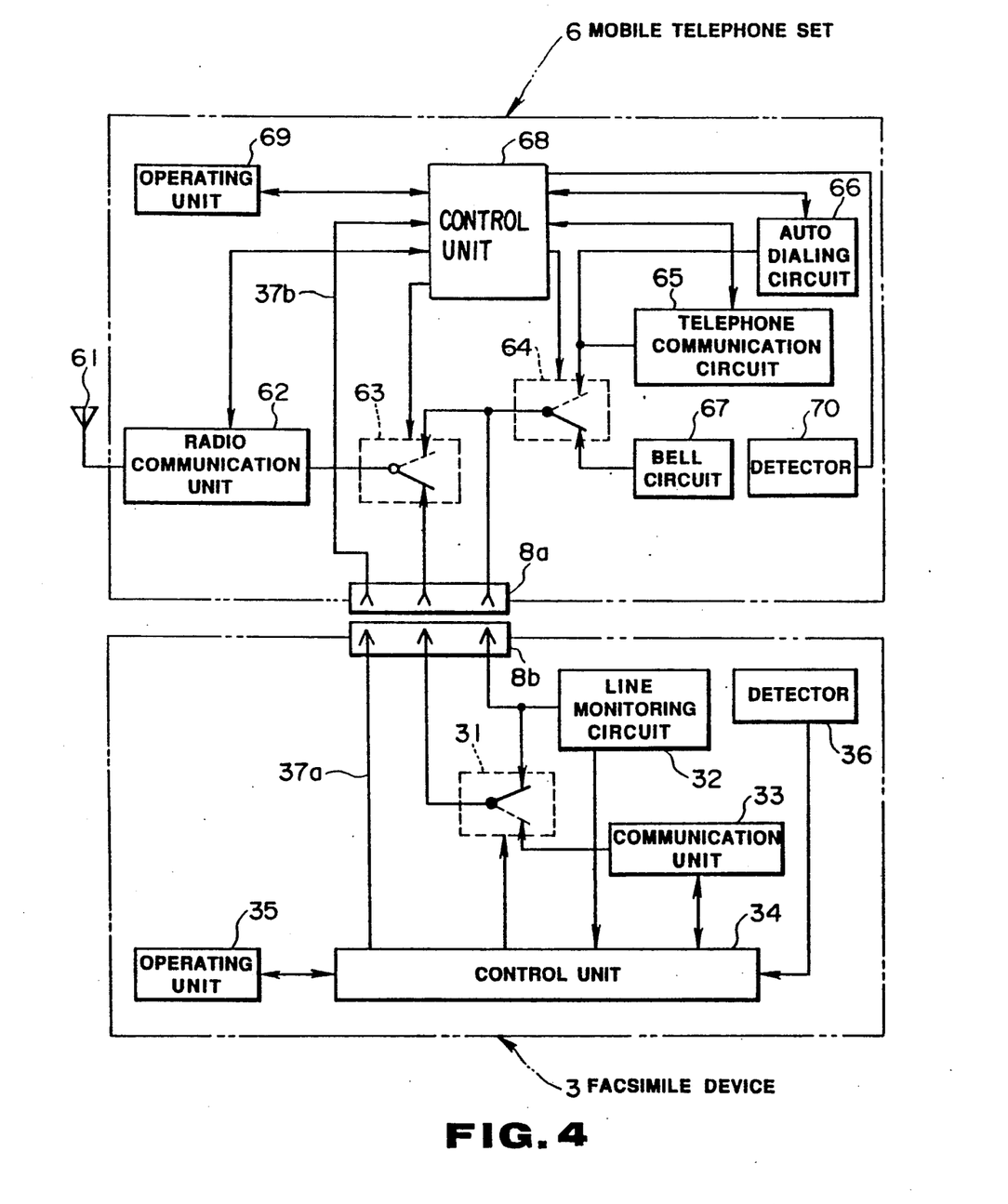
FIGS. 4-6 are a detailed block diagram of the essential portion of an image communication apparatus as each of other embodiments according to the present invention.

As another embodiment of the present invention, the function of the detector 36 can be had not only by the facsimile device 3, but also by the mobile telephone set 6. FIG. 4 illustrates the structure of circuit of the particular embodiment in which the mobile telephone set 6 includes a detector 70 corresponding to the detector 36 of the facsimile device 3.

By provision of such detecting function in the mobile telephone set 6, the mobile telephone set 6 can by itself recognize the lift of the mobile telephone set 6 from the facsimile device 3 to disconnect the mobile telephone set 6 from the facsimile device 3 and similarly recognize that disconnection as in the off-hook operation to provide operation control.

Therefore, the use of this function further simplifies a shift to facsimile communication, for example, by lifting the mobile telephone set 6 to respond through telephone communication to bell ringing reporting the arrival of an incoming signal and connecting the mobile telephone set 6 again with the facsimile device when the incoming signal is a facsimile signal at the time.

Similarly, in call origination, a shift to facsimile transmission is easily performed by lifting the mobile telephone set 6 to immediately put the mobile telephone set 6 in an off-hook state and connecting the mobile telephone set 6 again with the facsimile device 3 when the addressee's terminal is recognized as a facsimile device by the addressee's response to the call occurring after the off-hook state has been brought about.

The mobile telephone set 6 under disconnection by itself respond to an incoming signal by detecting the lifting of the mobile telephone set 6 from the facsimile device 3, changing the changeover switch 63 to the broken line side shown and switching the hook switch 64 to the solid line side shown.

Figure 5:
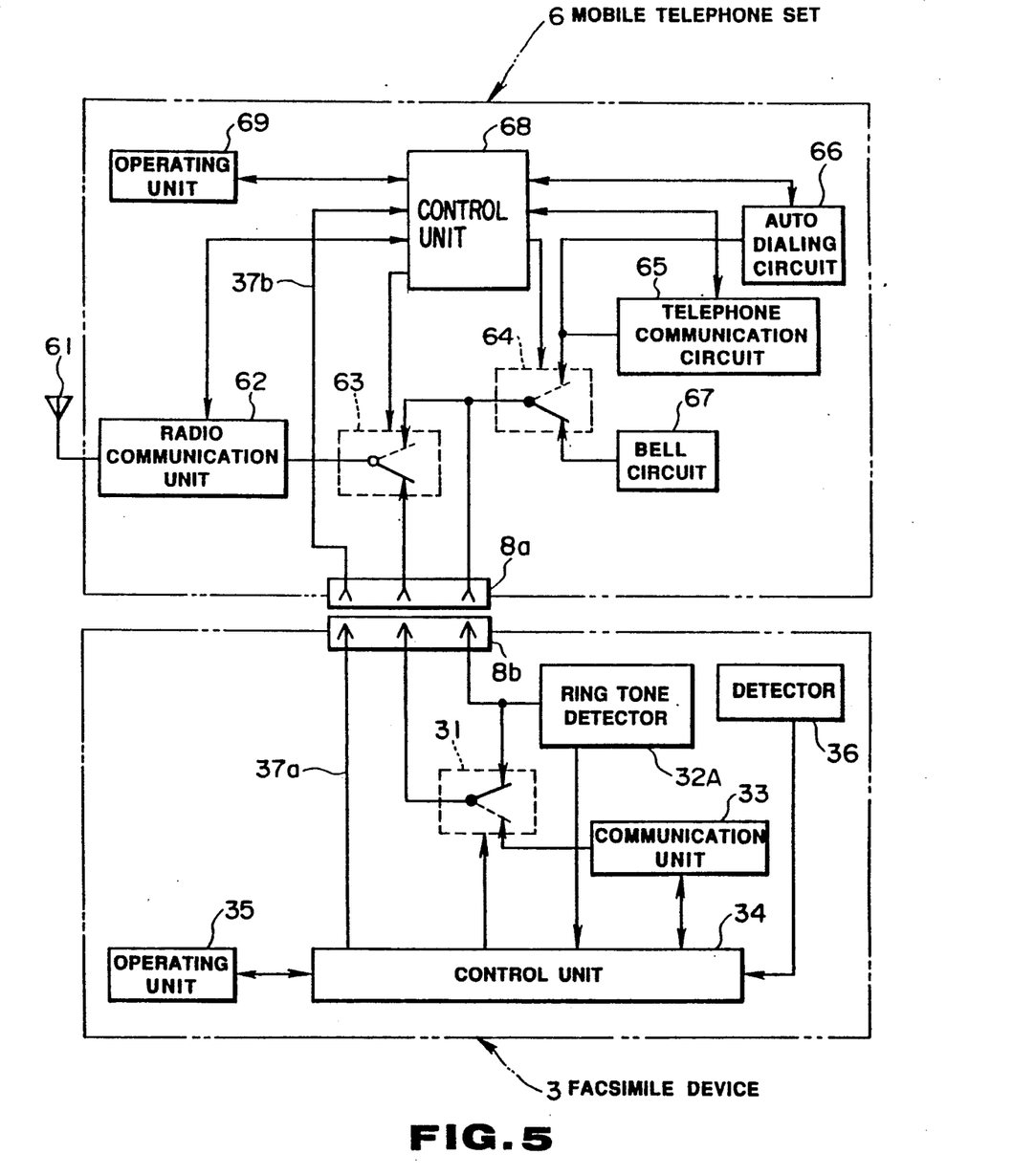

In a further embodiment of the present invention, the line monitoring circuit 32 of the facsimile device 3 may be constituted by a ring tone detector. FIG. 5 illustrates the structure of the circuit of the further embodiment in which a ring tone detector 32A is connected between the changeover switch 31 of the facsimile device 3 and the connector half 8b. The ring tone detector 32A has only a function of detecting a ring tone incoming through the radio communication unit 62 from the telephone line 1 and has no function of recognizing other line conditions (for example, of polarity inversion).

Therefore, this embodiment can automatically respond to an incoming facsimile signal by detecting the arrival of the incoming signal when the mobile telephone set is connected with the facsimile device, but it cannot open the telephone line automatically even if the addressee's terminal ends its transmission and thus the operator must open the line manually by recognizing the situation. However, in this embodiment, structure and control are simplified advantageously compared with the case where the line monitoring circuit 32 is used.

Figure 6:
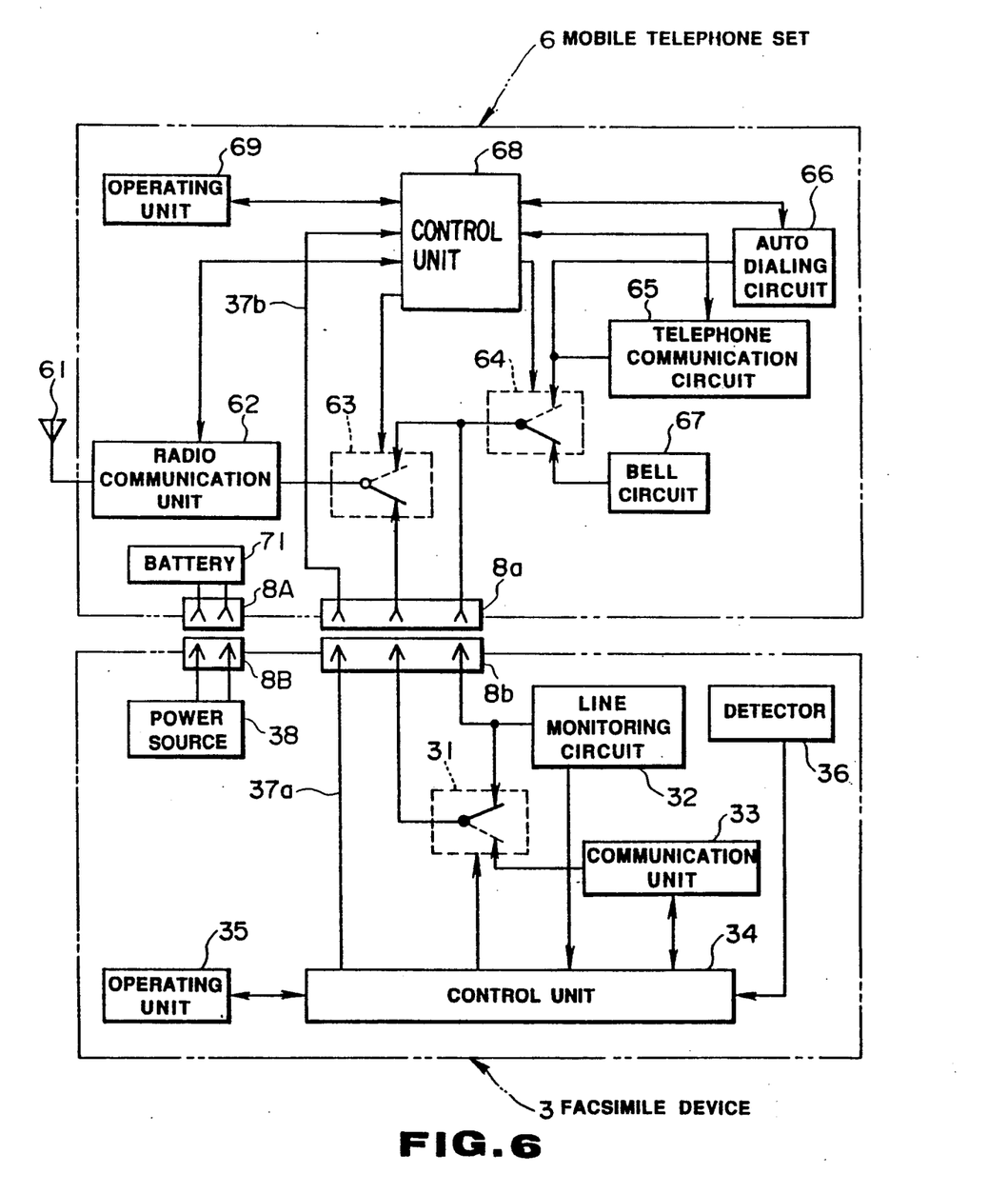

In another embodiment, the facsimile device 3 may have a connector half and power supply means when the mobile telephone set 6 is of charging type and has a connector half mating with the connector half of the facsimile device and having charging terminals such that charging is started when the mobile telephone set is connected with the facsimile device 3. FIG. 6 is a block diagram of the particular embodiment in which the mobile telephone set 6 and the facsimile device 3 have removable connector halves 8A and 8B, respectively, as connecting meas corresponding to the connector halves 8a and 8b.

The connector 8A is connected with a battery 71 which is a source for operation of the mobile telephone set 6. The connector half 8B is connected with a power source circuit 38 of the facsimile device 3. Thus, when the mobile telephone set 6 is connected with the facsimile device 3, the battery 71 is directly connected with the power source circuit 38 through the connector halves 8A and 8B, so that the power source circuit 38 can charge the battery 71.

Usually, charging the mobile telephone set 6 is performed by connecting with the base unit 5. In this arrangement, it is unnecessary to carry the mobile telephone set 6 to the base unit 5, so that the charging operation efficiency is improved.

In any of the embodiments, a system structure may be employed in which a plurality of mobile telephone sets 6 are disposed (see FIG. 2), in which case, usually, the mobile telephone set 6 can be used separately from the facsimile device 3 for telephone communication and connected with the facsimile device 3 only when a request for facsimile communication is made and hence a limitation to the place where the mobile telephone set is used is further alleviated.

While in each of the above embodiments the mobile telephone set of the cordless telephone device used in general offices and households is illustrated as one to be connected with the facsimile device, the present invention is applicable similarly to vehicle-mounted cordless telephone devices, of course.

In the present invention, various steps are available for selection of a telephone communication path. For example, a connector with a changeover switch may be used for that purpose, or a manual switch provided on the facsimile device may be operated so as to send a switching signal to the mobile telephone set to interrupt the communication path.

What is claimed is:

1. An image communication apparatus comprising:
   means for removably connecting a mobile telephone set of a cordless telephone device and a facsimile device;
   first switching means for selectively switching a connection with a radio communication unit of the mobile telephone set to the connecting means or to a hook switch of the mobile telephone set;
   second switching means for selectively switching the connection to the connecting means either to an incoming signal path leading to the hook switch of the mobile telephone set through the connecting means or to a facsimile communication unit of the facsimile device;
   means for detecting the connection of the mobile telephone set with the facsimile device by the connecting means;
   means for monitoring a state of a telephone line and the presence of an incoming signal from the line; and
   control means for switching the first switching means to the connecting means and the second switching means to the incoming signal path when the mobile telephone set is connected to the facsimile device, and for switching the second switching means to the facsimile communication unit when the monitoring means detects an incoming signal;
   wherein when the mobile telephone set is performing a telephone communication with the facsimile device while the mobile telephone set is disconnected from the facsimile device, the mobile telephone set issues a communication starting command to thereby place the mobile telephone set compulsively in an off-hook state, and thereafter when a reconnection of the mobile telephone set with the facsimile device is recognized, the first switching means is switched to the connection means and the second switching means is switched to the facsimile communication unit to thereby shift to a facsimile communication.

2. An image communication apparatus comprising:

means for removably connecting a mobile telephone set of a cordless telephone device and a facsimile device, said connecting means including first, second and third subconnectors each with respective portions in said mobile telephone set and said facsimile device;

first switching means for selectively switching a connection with a radio communication unit of the mobile telephone set to the connecting means or to a hook switch of the mobile telephone set;

second switching means for selectively switching the connection to the connecting means either to an incoming signal path leading to the hook switch of the mobile telephone set through the connnecting means or to a facsimile communication unit of the facsimile device;

means for detecting the connection of the mobile telephone set with the facsimile device by the connecting means;

means for monitoring a state of a telephone line and the presence of an incoming signal from the line; and control means for switching the first switching means to the connecting means and the second switching means to the incoming signal path when the mobile telephone set is connected to the facsimile device, and for switching the second switching means to the facsimile communication unit when the monitoring means detects an incoming signal;

wherein the connecting means further includes a fourth subconnector for constituting a charging path through which a drive power source for the mobile telephone set is connected with a power source for the facsimile device.

3. An image communication system comprising:

a base unit of a cordless telephone apparatus connected to a wired line;

a mobile telephone set of the cordless telephone apparatus including a radio communication unit for radio coupling with the base unit and including a hook switch;

a facsimile device having at least a ring tone detector and having a facsimile communication unit, the facsimile device being freely movable;

connecting means for removably connecting the mobile telephone set with the facsimile device;

first switching means for switching the radio communication unit of the mobile telephone set between the hook switch of the mobile telephone set, on the one hand, and, through the connecting means, a second switching means, or the other hand;

the second switching means being in the facsimile device and being means for switching between the facsimile communication unit and the at least ring tone detector in the facsimile device;

means for detecting a connection of the mobile telephone set with the facsimile device, the connection comprising a connecting of the connecting means; and first control means in the mobile telephone set for switching the first switching means to the second switching means and second control means in the facsimile device for switching the second switching means to the at least ring tone detector, when the connection of the mobile telephone set with the facsimile device is detected by the detecting means.

4. An image communication system according to claim 3, wherein in the mobile telephone unit the second control means includes means for controlling the second switching means to be switched to the facsimile communication unit to thereby control the facsimile device to be in an image receiving mode when an incoming call is detected by the circuit or in an image transmission mode when a facsimile call is originated while the mobile telephone set is connected with the facsimile device.

5. An image communication system according to claim 3, wherein the mobile telephone set includes a telephone communication circuit and a bell circuit alternately connectable to the hook switch, and wherein in the mobile telephone circuit the first control means controls the first switching means to be switched to the hook switch to thereby control the mobile telephone set to be in a communication stand-by mode when an off-hook operation or an operation of disconnecting the mobile telephone set from the facsimile device is performed while the mobile telephone set is connected with the facsimile device.

6. An image communication system according to claim 3, wherein the mobile telephone set includes means for transmitting a user-generated communication starting command, when the mobile telephone set is performing a telephone communication with the facsimile device while the mobile telephone set is connected with the facsimile device, to switch the first switching means to the connecting means and the second switching means to the facsimile communication unit to shift to a facsimile communication.

7. An image communication system according to claim 3, wherein, because a user of the mobile telephone set may wish to perform a communication using the facsimile device while the mobile telephone set is disconnected from the facsimile device, the mobile telephone set includes means for placing the mobile telephone set compulsively in an off-hook state, and further the control means therein controls, when the mobile telephone set is connected with the facsimile device, the first switching means to switch to the connection means and the control means in the facsimile device controls the second switching means to switch to the facsimile communication unit, thereby to shift to a facsimile communication.

8. An image communication system according to claim 3, wherein the connection detecting means comprises separate connection detecting means provided respectively in the facsimile device and the mobile telephone set, and wherein a respective one of the first and second control means enables the mobile telephone set to utilize a detection result of one of the detecting means as an off-hook indication.

9. An image communication system according to claim 3, wherein the mobile telephone set includes a telephone communication circuit and a bell circuit alternately connectable to the hook switch, and wherein in the facsimile device the second control means includes means for controlling the switching of the second switching means to the facsimile communication unit to be deferred by a predetermined time and the hook switch is connected to the bell circuit to provide incoming bell ringing for the predetermined time when an incoming call is received while the mobile telephone set is connected with the facsimile device.

10. An image communication system according to claim 9, wherein the at least ring tone detector is a line monitoring circuit capable of detecting polarity inversions on the signal path through the first switching means, the connecting means, the second switching means, and again through the connecting means to the hook switch, when the mobile telephone set is connected with the facsimile device.

11. An image communication system according to claim 9, wherein in the mobile telephone set the first control means controls the first switching means to be switched to the hook switch and the hook switch to be switched from the bell circuit to the telephone communication circuit while the incoming bell ringing is issued for the predetermined time when a user-controlled off-hook operation is performed while the mobile telephone set is connected to the facsimile device or when an operation of disconnecting the mobile telephone set from the facsimile device is performed to thereby control the mobile telephone set to be in a communication mode.

12. An image communication system according to claim 3, wherein the control means of the mobile telephone set includes a control unit and the control means of the facsimile device includes a control unit, wherein the connecting means includes halves of a first subconnector constituting a path for connecting the first switching means and the second switching means, halves of a second subconnector constituting a path through which an incoming signal input from the mobile telephone set through a path including the first subconnector is sent back to the hook switch of the mobile telephone set through the second switching means, and halves of a third subconnector constituting a control information transmission path between a control unit of the mobile telephone set and a control unit of the facsimile unit.

13. An image communication system according to claim 12, wherein the connecting means further includes respective halves of a fourth subconnector in the mobile telephone set and the facsimile device constituting a charging path through which a power source for the mobile telephone set can be connected with a power source for the facsimile device, and wherein the system includes a means for accommodating one of said power sources, said one power source being chargeable.

14. An image communication system comprising:
a base unit of a cordless telephone device connected to a wired line;
a mobile telephone set of the cordless telephone device connectable to the base unit via radio;
a facsimile device having an automatic answering function, the facsimile device being freely movable;
connecting means including respective portions in both the mobile telephone set and the facsimile device for removably connecting the mobile telephone set with the facsimile device and establishing a wired circuit connection therethrough;
first switching means for switching a radio communication unit of the mobile telephone set either to the connecting means or to a hook switch of the mobile telephone set;
second switching means for switching the connection through the connection means of the facsimile device either to a facsimile communication unit of the facsimile device or to a line monitoring circuit of the facsimile device;
means for detecting a connection of the mobile telephone set with the facsimile device through the wired circuit of the connecting means; and
control means for switching the first switching means to the connecting means and for switching the second switching means to the line monitoring circuit, when the connection of the mobile telephone set with the facsimile device is detected by the detecting means.

15. An image communication system according to claim 14, wherein the second switching means is switched to the facsimile communication unit to thereby control the facsimile device to be in an image receiving mode employing the automatic answering function when an incoming call is detected by the line monitoring circuit, or to be in an image transmission mode when a facsimile call is originated while the mobile telephone set is connected with the facsimile device.

16. An image communication system according to claim 14, wherein the first switching means is switched to the hook switch and the hook switch is switched to a telephone communication circuit of the mobile telephone set or to an auto-dialing circuit to thereby control the mobile telephone set to be in a communication stand-by mode when the off-hook operation or the operation of disconnecting the mobile telephone set from the facsimile device is performed while the mobile telephone set is connected with the facsimile device by the connecting means.

17. An image communication system according to claim 14, wherein when the mobile telephone set is performing a telephone communication with the facsimile device while the mobile telephone set is connected with the facsimile device by the connecting means, the mobile telephone set issues a communication starting command to thereby switch the first switching means to the connecting means and the second switching means to the facsimile communication unit to shift to a facsimile communication.

18. An image communication system according to claim 14, wherein, when a command is issued to start a communication using the facsimile device while the mobile telephone set is disconnected from the facsimile device, the mobile telephone set transmits the command to thereby place the mobile telephone set compulsively in an off-hook state, and thereafter when the mobile telephone set is connected with the facsimile device, the first switching means is switched to the connection means and the second switching means is switched to the facsimile communication unit to shift to a facsimile communication.

19. An image communication system according to claim 14, wherein the detecting means comprises separate connection detecting means provided respectively in the facsimile device and the mobile telephone set, and wherein the mobile telephone set utilizes a detection result of one of the detecting means as an off-hook indication.

20. An image communication system according to claim 14, wherein the line monitoring circuit is selected from the group consisting of a circuit for detecting only ring tone and a circuit for detecting polarity inversions and ring tone.

21. An image communication system according to claim 14, wherein the switching of the second switching means to the facsimile communication unit is deferred for a predetermined time and incoming bell ringing is issued for the predetermined time when an incoming call is received while the mobile telephone set is connected with the facsimile device by the connecting means.

22. An image communication system according to claim 21, wherein the connecting means includes a signal path through which the line monitoring circuit is connected with the hook switch through the respective portions of the connecting means when the mobile telephone set is connected with the facsimile device to issue the incoming bell ringing by using a bell circuit of the mobile telephone set connected to the hook switch.

23. An image communication system according to claim 21, wherein the control means controls the first switching means to switch to the hook switch and the hook switch to switch from the bell circuit to the telephone communication circuit while the incoming bell ringing is issued for the predetermined time when an off-hook operation is performed while the mobile telephone set is connected to the facsimile device or when an operation of disconnecting the mobile telephone set from the facsimile device is performed to thereby control the mobile telephone set to be in a communication mode.

24. An image communication system according to claim 14, wherein the connecting means includes halves of a first subconnector constituting a path for connecting the first switching means and the second switching means, halves of a second subconnector constituting a path through which an incoming signal input from the mobile telephone set through a path including the first subconnector is sent back to the hook switch means, and halves of a third subconnector constituting a control information transmission path between a control unit of the mobile telephone set and a control unit of the facsimile unit.

25. An image communication system according to claim 24, wherein the connecting means further includes respective halves of a fourth subconnector in the mobile telephone set and the facsimile device constituting a charging path through which a drive power source for the mobile telephone set can be connected with a power source for the facsimile device.

* * * * *